United States Patent [19]

Batchelor et al.

[11] Patent Number: 5,473,027

[45] Date of Patent: Dec. 5, 1995

[54] PRODUCTION OF BLOW MOLDING POLYETHYLENE RESIN

[75] Inventors: Robert L. Batchelor; Gene E. Kellum, both of Orange, Tex.

[73] Assignee: Chevron Chemical Company, San Ramon, Calif.

[21] Appl. No.: 257,618

[22] Filed: Jun. 9, 1994

Related U.S. Application Data

[63] Continuation of Ser. No. 788,324, Nov. 5, 1991, abandoned, which is a continuation-in-part of Ser. No. 654,176, Feb. 12, 1991, abandoned, which is a continuation of Ser. No. 153,164, Feb. 8, 1988, abandoned, which is a continuation-in-part of Ser. No. 876,950, Jun. 20, 1986, abandoned.

[51] Int. Cl.$^6$ .................................. C08F 4/24; C08F 10/02
[52] U.S. Cl. ....................... 526/106; 526/348.6; 526/352
[58] Field of Search ................................................ 526/106

[56] References Cited

U.S. PATENT DOCUMENTS

| | | | |
|---|---|---|---|
| 4,011,382 | 3/1977 | Levine et al. | 526/106 |
| 4,041,224 | 8/1977 | Hoff et al. | 526/106 |
| 4,255,542 | 3/1981 | Broun et al. | 526/106 |
| 4,540,755 | 9/1985 | Mayhew et al. | 526/130 |
| 5,066,736 | 11/1991 | Dumain et al. | 526/82 |
| 5,155,186 | 10/1992 | Hatzan et al. | 526/106 |

OTHER PUBLICATIONS

"Alpha–Olefin Polymerization in the Presence of Solid Catalysts, Attempts of Determine the Role of Oxygen in the Polymerization of Ethylene in the Presence of a Chromium Oxide Catalysts", Dahlig et al., Khimiya i Teknologiya Polimerov, No. 4, 23 (1961).

"Transfer Processes During Polymerization of Ethylene on a Chromium Oxide Catalyst, II. The Role of Impurities in Transfer Reactions", Ermakov et al., Kinetika i Kataliz (USSR), vol. 10, No. 2 (1969).

Primary Examiner—Edward J. Smith
Attorney, Agent, or Firm—C. D. Holland; T. G. DeJonghe

[57] ABSTRACT

Disclosed is a process for making polyethylene resin by reacting ethylene or ethylene and a $C_3$-$C_8$ alpha-olefin in the presence of a $CrO_3/TiO_2$ catalyst on a silica support in a gas-phase polymerization reactor and in the presence of a catalyst productivity reduction agent such as oxygen. The resin in one embodiment has a melt flow ratio between 65 and 140 and a melt index between 0.1 and 0.6 g/10 min. The resin is particularly suitable for use in blow-molding applications.

12 Claims, No Drawings

PRODUCTION OF BLOW MOLDING POLYETHYLENE RESIN

CROSS REFERENCE TO RELATED APPLICATIONS

This application is a continuation of application U.S. Ser. No. 788,324, filed Nov. 5, 1991, now abandoned, which is a continuation-in-part of application U.S. Ser. No. 654,176, filed Feb. 12, 1991 and now abandoned, which in turn is a continuation of application Ser. No. 153,164, filed Feb. 8, 1988 and now abandoned, which in turn is a continuation-in-part of U.S. Ser. No. 876,950, filed Jun. 20, 1986 and now abandoned.

BACKGROUND OF THE INVENTION

The present invention relates to gas phase polymerization of ethylene using a supported chromium-titanium catalyst, and especially to production of polyethylene resins suitable as feedstock for making a blow molding resin.

Polymerization of ethylene to solid polymers dates back over 50 years. However, early ethylene polymerization was carried out at high pressures, in excess of 1,000 psig, and the costs of production were relatively high. In the early 1950's, Karl Ziegler and others disclosed catalysts and processes that produced polyethylene at much lower pressures. Since that time, the production of polyethylene has grown immensely, and there has been a succession of improvements and alternate catalysts and processes disclosed.

Ziegler and his co-workers disclosed that polyethylene could be made at low pressure using binary mixtures of metal alkyls and transition metal salts, such as aluminum triethyl and titanium tetrachloride.

Hogan and Banks, at Phillips Petroleum, disclosed that polyethylene and other polyolefins could be made at moderate pressures using catalyst comprising chromium compounds on a silica support, see U.S. Pat. No. 2,825,721. Polyethylene is produced in the Phillips' process in a slurry system (sometimes called "particle form process"). In the slurry system, a slurry of isobutane or isopentane with suspended catalyst and polymer particles is circulated in a reactor loop. As larger polymer particles are formed, they enter a settling zone and are withdrawn from the reactor loop.

In contrast to the slurry system, various gas phase systems have been disclosed. For example, in the Union Carbide process, a fluidized bed is maintained by circulated gaseous ethylene. The term "gas-phase polymerization" has been called a misnomer because the polymerization is believed to occur on or within solid particles of polyethylene contained in the reaction zone. But this gas phase terminology is useful because it contrasts to the slurry system and it is descriptive of the mostly gas phase conditions in the reaction zone.

Naphtachimie has also disclosed gas phase ethylene polymerization, see, for example, U.S. Pat. No. 3,922,322.

Still further, Amoco has described a horizontal mechanically stirred gas phase system, see, for example, U.S. Pat. No. 3,965,083; U.S. Pat. No. 3,971,768; and U.S. Pat. No. 4,129,701.

Catalysts used in the gas phase processes and in slurry systems include hexavalent chromium oxide deposited on a silica carrier as described in the previously mentioned U.S. Pat. No. 2,825,721; chromium oxide-titanium oxide-silica as described in U.S. Pat. No. 3,622,521; silyl chromate on silica as described in U.S. Pat. No. 3,324,101; bis-(cyclopentadienyl)chromium (II) on silica as described in U.S. Pat. No. 3,709,853; organo-aluminum-titanium halide catalyst of the Ziegler type; and chromium oxide-titanium oxide-fluoride on a silica support as described in U.S. Pat. No. 4,011,382.

U.S. Pat. Nos. 3,780,011 and 4,041,224 also disclose a catalyst containing chromium and titanium compounds on a support such as silica. The '224 patent theorizes that after the catalyst is activated in the presence of oxygen, the catalyst has chromium atoms bridged to titanium atoms by oxygen in the form of Cr—O—Ti.

The amount of chromium and titanium used in the above-mentioned Cr—Ti—Silica catalysts frequently is stated to be in a rather broad range of about $1/10$ weight percent to 10 weight percent. For example, U.S. Pat. No. 4,041,224 states the amount of chromium is preferably between 0.1 and 10 weight percent and that "a catalyst composition containing 1 weight percent chromium is highly active; consequently, there is ordinarily no reason to use a larger percent." The quantity of titanium is stated in the '224 patent to preferably be 0.5 to 8 weight percent based on the weight percent of the support material, and more preferably in the range 2 to 6 weight percent.

U.S. Pat. No. 4,540,755, entitled "Inclusion of Oxygen in the Polymerization of Olefins", discloses the polymerization of olefins with an oxygen containing gas using a supported organophosphoryl-chromium oxide catalyst. The reaction is carried out in the '755 patent in the liquid phase, such as in a slurry system. The inclusion of oxygen is said to result in improved physical properties for the resins produced, such as polyethylene resins. The ratio of HLMI to MI trends generally downward with increasing oxygen in the feed according to the exemplary data and catalyst used in the '755 patent.

In two foreign references, Ermakov et al., "Transfer Processes During Polymerization of Ethylene on a Chromium Oxide Catalyst, II, The Role of Impurities in Transfer Reactions," Kinetika i Kataliz (USSR), Vol. 10, No. 2 (1969) and Dahlig et al., Khimiya i Teknologiya Polimerov, No. 4, 23 (1961), the use of oxygen (and also carbon monoxide, acetylene, carbon dioxide, and hydrogen in the Ermakov reference) is disclosed as having the effect of lowering the molecular weight of polyehtylene produced in a chromium based catalyzed polymerization of ethylene.

SUMMARY OF THE INVENTION

According to the present invention, a process is provided for polymerizing ethylene under gas phase polymerization conditions to produce polyethylene homopolymer or copolymer resins, especially resins suitable for blow molding use. The process comprises feeding ethylene to a polymerization reaction zone; contacting the ethylene under gas phase ethylene polymerization reaction conditions with a catalyst comprising 0.4 to 10.0 weight percent chromium and 0.1 to 10.0 weight percent titanium on an inorganic refractory oxide support; and injecting catalyst taming agent into the reaction zone. Preferably, the amount of catalyst taming agent injected is sufficient to maintain taming agent levels equivalent to the injection of 0.01 to 3 moles oxygen gas per million moles of fresh ethylene fed to the reaction zone. The term "fresh" ethylene feed is used to distinguish from the total ethylene feed to the reaction zone, which includes fresh, as well as recycle ethylene.

Among other factors, the present invention is based on our finding that a relatively high chromium content catalyst as described herein, in combination with oxygen injection (or the equivalent) into the polymerization reaction zone, can be successfully applied to gas phase polymerization production of a resin suitable for use as a blow molding resin feedstock. We have found that the same catalysts that are successful in a typical slurry process to produce a polyethylene resin suitable for blow molding are not successful in a typical gas phase process. We have found that a combination of relatively high chromium level in a chromium titanium-refractory support catalyst, with use of a taming agent such as oxygen-containing gas, can be successfully used to produce blow molding resin feedstock in gas phase polymerization.

The resins which we refer to herein, such as blow molding resin feedstock, are the product materials "off the reactor", that is before downstream-of-the-reaction zone processing, such as compounding, etc. The resins off the reactor are typically subjected to compounding treatments with various additives at 300° to 600° F. prior to being used in the actual blow molding process. Thus, the terminology "blow molding resin" or "film resin" or "pipe resin" is used herein to connote the resin as produced off the reactor and not the resin as finely prepared by subsequent compounding or the like.

The process of the present invention has been found to improve control in carrying out a gas phase polymerization process to produce resins, such as blow molding resins, film resins and other polyethylene resins. We have found that the present invention utilizing relatively high chromium content catalysts with oxygen or the like injected in the polymerization reaction zone results in usually higher and more controllable melt flow ratios (MFR) for the product resin than achieved in our earlier gas phase polymerization runs and also in higher melt index (MI) for the product. Preferably, the amount of taming agent injected into the reaction zone is sufficient to raise the MFR of the product off the reactor by at least two units, more preferably, by at least five units and most preferably, by eight units or more compared to product that would be obtained off the reactor without the taming agent injection. For example, if for a given set of reaction conditions without use of taming agent the product MFR would be 60, the preferred amount of taming agent would be sufficient to raise the MFR by at least two units and hence to 62 or higher.

Thus, an important aspect of the present invention is the attainment of higher MFR, using the oxygen or equivalent coupled with using a relatively high chromium content catalyst, than would be achieved with that catalyst without oxygen or equivalent fed to the reaction zone.

MFR is the ratio of high load melt index (HLMI) to MI. MI and HLMI are g/10 min. at 190° C. and are determined in accordance with ASTM method D-1238 65T using a weight of 2.16 kg and 21.6 kg, respectively.

Preferably, the process of the present invention is applied to blow molding resin production. For blow molding resin production, preferred MFR for the resins as produced off the reactor are from about 55 to 140 and are dependent upon the Melt Index and end use. For Melt Indices in the range 0.6 and higher such as 0.6 to 2.0, preferred MFRs are from 50 to 90, more preferably from 60 to 85. For MI in the range 0.1 to 0.6, preferred MFRs are from 65 to 140, more preferably between 75 and 130, and most preferably between 85 and 125.

Preferred densities for blow molding resin product are between 0.940 and 0.970 gms/cm$^3$, more preferably, between 0.950 and 0.965.

Temperatures and pressures used in the process of the present invention are sufficient to conduct the reaction with ethylene in gas phase, as that term is previously explained, and in contrast to slurry-type systems which carry out the reaction in liquid phase solvent containing dissolved ethylene. Preferred temperatures for the present gas phase process are between 100°–230° F., more preferably, between 150° and 230° F. and most preferably, between 190° and 230° F. Preferred pressures are below 500 psig, more preferably, between 100 and 500 psig, and still more preferably, between 150 and 400 psig, and most preferably, between 250 and 350 psig.

It is important in the process of the present invention to inject a catalyst taming agent into the reaction zone. The taming agent or catalyst poison should be effective to reduce the productivity of the catalyst. The productivity of the catalyst is the amount of polyethylene produced per unit weight of fresh catalyst added to the reaction zone. For example, productivity of the catalyst may be measured in terms of pounds of polyethylene produced per hour divided by pounds of fresh catalyst introduced to the reaction zone per hour. In theory, the taming agent may work in a variety of ways, such as by causing reactions which compete with the ethylene polymerization reaction or by interacting with polymerization sites on the catalyst or by terminating ethylene polymerization chains or by a combination of the foregoing. In the present invention, the taming should be effective to raise the MFR of the polyethylene resin produced off the reactor. The number of units the taming agent raises the MFR preferably is at least two, more preferably, at least five units, and most preferably, at least eight units.

The taming agent used in the process of the present invention is preferably oxygen gas, but can also be selected from other materials that perform similarly, including, for example, carbon monoxide, acetylene or water. Various other polar compounds may also be used, such as alcohols, aldehydes, ketones, and organic acids. Example alcohols include methanol and ethanol; example aldehydes include formaldehyde, acetaldehyde, propionaldehyde; example ketones include acetone, methyl ethyl ketone, methyl isobutyl ketone; example organic acids include acetic acid. Also, certain inorganic acids can be used, for example, hydrogen fluoride or hydrogen chloride.

When using the preferred oxygen gas taming agent, preferably the amount of oxygen is 0.01 to 3 moles oxygen per million moles of fresh ethylene fed to the reaction zone, more preferably, 0.05 to 0.6 moles of oxygen per million moles of fresh ethylene fed to the reaction zone, and most preferably 0.1 to 0.4 moles oxygen per million moles fresh ethylene fed to the reaction zone. The preferred amount of taming agent is adjusted in combination with the particular high chromium content catalyst and product properties desired.

The preferred oxygen gas taming agent preferably is injected in the recycle gas stream prior to the introduction of the recycle gas into the reactor vessel. Preferably, the oxygen gas is added in mixture with nitrogen, such as in an amount of 4 to 10% oxygen to 96 to 90% nitrogen.

The gas phase reaction can be carried out in various types of reactors so long as the reaction is conducted in the gas phase. Thus, a mechanically stirred reaction zone in a horizontal or vertical reactor may be used or a fluidized bed in a vertically disposed reactor may be used. A fluidized bed is preferred, such as described, for example, in U.S. Pat. No. 4,011,382. The bed of catalyst particles/polyethylene is fluidized by upwardly flowing ethylene gas.

The feed ethylene preferably is highly purified. Conventional processes may be employed to purify the ethylene, such as by passing the ethylene through beds of copper oxide or lead oxide on alumina, molecular sieves, hydrogenation catalyst or all three of these, to remove impurities, such as carbonyl sulfide, carbon monoxide and arsenic; water; and acetylene. Oxygen can be removed by treatment with a supported copper catalyst. Carbon dioxide impurity can be removed by passing the ethylene through a bed of solid caustic. Preferably, the feed ethylene contains no more than 1 ppm, more preferably, less than 0.5 ppm and most preferably, less than 0.05 ppm of the foregoing impurities. However, certain of these impurities such as the water, carbon monoxide and/or acetylene, may be adjusted to purposely leave them at a level equivalent to the preferred oxygen levels used with the high-chromium catalyst in the present invention. Although this is not our preferred mode of operating the present invention, it is within the scope of the present invention, particularly when used to control product MFR.

The high purity ethylene preferably fed to the process of the present invention may contain nitrogen, for example, 1 to 50 mole percent nitrogen, more preferably, 5 to 25 percent, most preferably, 7 to 17 percent nitrogen.

The ethylene may be polymerized to a homopolymer, or to a copolymer using a $C_3$-$C_8$ alpha-olefin as a comonomer feed. Preferred alpha-olefins comonomers are butene-1 and hexene-1. Preferred amounts of the comonomer feed are 0.05 to 10 mole percent of the total (fresh plus recycle) ethylene feed, more preferably, 0.1 to 3 mole percent of the total ethylene feed, and most preferably, 0.25 to 2.0 mole percent of the total ethylene feed.

The catalyst used in the process of the present invention should contain at least 0.4 weight percent chromium. Preferably, the chromium amounts are between 0.7 and 2.0 weight percent and more preferably, between 0.8 and 1.2 weight percent. Preferably, the titanium content of the catalyst is between 1.0 and 6.0 weight percent, more preferably, between 3.0 and 5.0 weight percent.

The catalyst contains the foregoing metals on a refractory support, such as silica, silica alumina, zirconia, thoria, etc. Silica is particularly preferred, for example, finely divided silica available from Davison Chemical Company and commonly designated as "952" silica support.

The chromium compound used in preparing the catalyst can be selected from various organic or inorganic forms of chromium. Chromium compounds, such as chromium acetate and chromium trioxide, are two preferred sources for the chromium. Likewise, various titanium compounds can be used to prepare the catalysts; titanium tetraisopropoxide is one preferred source for the titanium component in the catalyst preparation.

Preferably, the catalyst is prepared by impregnating the chromium compound onto finely divided high surface area, silica support; drying at 200°–450° F. for several hours; then adding the titanium compound and activating in air or other oxygen-containing gas at 800°–1600° F. A more detailed preferred catalyst preparation method is given below in the Examples.

Suitable catalysts can be prepared by alternative procedures, for example, by a cogel procedure where, instead of post-titanating the preferred silica base after the base is formed, the titanium and silica are formed together in a cogel procedure. In any case, the final catalyst must be a relatively high-chromium content catalyst, containing at least 0.4 weight percent chromium and more preferably, between 0.8 and 1.2 weight percent chromium.

It should be noted that the catalyst used in the present invention is preferably activated in the presence of an oxygen-containing gas, but this is distinct from and in addition to the element of the present invention which requires the use of a taming agent, such as an oxygen-containing gas during the course of the polymerization reaction. Also, it is to be noted that the catalysts used in the present invention are distinct from the organochromium catalysts such as bis(triphenylsilyl) chromate on silica, or bis-(cyclopentadienyl)chromium on silica, as in U.S. Pat. Nos. 3,324,101 and 3,709,853, respectively. These latter organochromium catalysts are not activated at high temperature, such as 800°–1600° F., in the presence of oxygen.

The catalysts used in the process of the present invention preferably are not prepared using the reaction product of an organophosphorus compound with chromium, such as described in U.S. Pat. No. 4,540,755. The catalyst used in the process of the present invention preferably does not derive from an organophosphoryl-chromium material. Instead, preferably the catalyst derives from a hexavalent chromium compound, such as chromium trioxide, or from an organic or inorganic salt of chromium, such as chromium acetate or chromium nitrate. Also, unlike the catalyst exemplified in U.S. Pat. No. 4,540,755, the catalyst used in the present invention contains titanium.

Catalyst preparation procedures as described in U.S. Pat. No. 3,622,521 are preferably used in preparing the chromium-titanium catalysts used in the process of the present invention. The disclosure of the '521 patent is incorporated herein by reference, particularly as it relates to catalyst preparation, and resultant titanium-containing catalysts. Catalysts as described in the '521 patent, but with the chromium and titanium contents adjusted as described herein, are preferred for use in the process of the present invention. The preferred chromium compounds, which are used to prepare the catalysts for use in the process of the present invention, are those which contain in addition to chromium, only oxygen, and thermally degradable or volatile substituents, such as, for example, is the case with chromium acetate.

EXAMPLES AND FURTHER DESCRIPTION

A preferred catalyst preparation procedure for a catalyst for use in the process of the present invention is as follows. The starting material commonly is a commercially available chromium-silica catalyst, such as the 969MS product available from Davison Chemical Division of W. R. Grace & Co. Such starting material can be prepared at various chromium levels and, for purposes of the present procedure, preferably is prepared to contain approximately one weight percent chromium, for example, 0.8 to 1.2 weight percent chromium. The chromium can be impregnated onto silica support using various techniques, for example, chromium acetate may be impregnated onto finely divided silica support. Suitable silica supports include silica "952", available from Davison. The catalyst support material preferably has a surface area between 200 and 500 $m^2$/gm, for example, approximately 250 $m^2$/gm and a pore volume between about 1.0 and 2.0 $cm^3$/gm, for example, approximately 1.6 $cm^3$/gm.

After impregnating the chromium component onto the catalyst support, the resulting catalyst base is dried in a fluidized bed at about 200° to 400° F., preferably, approximately 250° F., for several hours, preferably, approximately 4 hours, in air, nitrogen, or a mixture of air and nitrogen.

Titanium compound is next added to the dried catalyst base. This can be done in a variety of ways. The titanium compound can be added in various forms, such as titanium ester compounds, preferably, titanium tetraisopropoxide. The dry catalyst base can be slurried in a hydrocarbon, such as isopentane, and then the titanium compound added to it. For example, 25 cm$^3$ of titanium tetraisopropoxide can be slurried with 100 grams of catalyst base and the temperature gradually raised to approximately 113° F. and then held for one-half hour.

Next, the solvent is evaporated by raising the temperature to approximately 158° F. Drying is continued until all of the hydrocarbon is removed and then the catalyst material is cooled to ambient temperature.

Next, the dried, titanium-impregnated catalyst is transferred to a fluidized bed catalyst activator wherein the catalyst is subjected to initial heat treatment at approximately 250° F. under nitrogen, or a mixture of air and nitrogen.

After one hour, the fluidizing gas is changed to air and the temperatures programmed to rise to 1525° F. at a rate of 100° F. increase in temperature per hour. When the temperature reaches 1525° F., the catalyst is held at this temperature for 12 hours. Then the catalyst is cooled to 500° F. At 500° F., the gas is changed to nitrogen and one hour later the catalyst is removed from the activation step.

Because the catalysts are activated in the presence of oxygen at high temperature, it will be understood that the chromium and titanium of the catalyst are present in oxide form in the activated catalyst. However, the oxidation state of the chromium and titanium may change during the ethylene polymerization reaction. Also, it is believed that the chromium and titanium in the catalyst are coordinated to at least some extent with each other, probably through oxygen atoms, and that at least the chromium (and possibly the titanium also) are coordinated with alkyl bonds and/or hydrogen bonds as well as oxygen bonds when the catalyst is in the active form in the ethylene polymerization process. The weight percent chromium and titanium are given herein as the element rather than as the compound, such as chromium oxide or titanium oxide.

Catalysts were prepared using the procedure indicated above, and were tested in a test unit at the temperatures and other conditions indicated in Table I below. The test reactions were conducted in gas phase in a fluidized bed, substantially like the fluidized bed system illustrated in U.S. Pat. No. 4,011,382. For those runs where oxygen is indicated, a stream of 7% oxygen in nitrogen was fed into the reactor with the total (recycle plus fresh) ethylene gas feed to the reaction vessel. The amount of oxygen is on a basis of moles (or volumes) of oxygen gas per moles (or volumes) of fresh ethylene feed.

The types of catalysts tested were as follows: No. 1 was a 1% chromium-on-silica catalyst, referred to as 969 MS and commercially available from Davison. No. 3 was a 0.25 weight percent chromium and 4.0 weight percent titanium on silica; the No. 3 catalyst was substantially similar to the No. 1 catalyst except for the reduced chromium and the addition of titanium. The No. 5 catalyst was 1% chromium and 4% titanium on silica, and also was substantially the same as No. 1, except for the added titanium.

The ethylene, hydrogen, comonomer (if any), and oxygen or other taming agent (if any), feed amounts and several of the resultant product properties are listed in Table I for the different catalysts tested and for the differing reaction conditions.

TABLE I

| Example No. | 1 | 2 | 3 | 4 | 5 | 6 | 7 | 8 | 9 | 10 | 11 | 12 |
|---|---|---|---|---|---|---|---|---|---|---|---|---|
| Catalyst No. | 1 | 3 | 3 | 5 | 5 | 5 | 5 | 5 | 5 | 5 | 3 | 3 |
| Reaction Temp., °F. | 216–218 | 212–214 | 210–212 | 220–221 | 219 | 210 | 220 | 219 | 219 | 218 | 215 | 211 |
| Ethylene, mole % purity | 85–87 | 88–89 | 88–90 | 86–88 | 86–88 | 84–86 | 5 | 85 | 85 | 85 | 85 | 85 |
| Hydrogen, mole % | 2.5–2.8 | None | 3 | 4 | 4 | 4.4 | 3.8 | 4.0 | 4.0 | 4.2 | 4.4 | 4.2 |
| Butene-1, mole % of total feed | 0 | 0.4–0.6 | 0.4–0.6 | 0.4–0.6 | 0.4–0.6 | 0.5–0.6 | None | None | None | None | 0.44 | 0.30 |
| Oxygen, * ppm V/V | 0 | .25 | .35 | 0 | .15 | .25 | 0 | .15 | .25 | .35 | .15 | .25 |
| MI | 0.05–0.09 | 0.31 | 0.41 | .41 | 0.42 | 0.35 | 0.28 | 0.30 | 0.31 | 0.40 | 0.55 | 0.45 |
| Density | 0.959 | 0.955 | 0.955 | 0.956 | 0.955 | 0.950 | 0.962 | 0.962 | 0.962 | 0.961 | 0.950 | 0.956 |
| MFR | | 75 | 73 | 74 | 80 | 106 | 82 | 87 | 96 | 100 | 75 | 85 |
| Productivity, lbs PE produced per pound of fresh catalyst | 50,000 | 10,500 | 7,700 | 28,500 | 13,400 | 9,100 | 29,000 | 16,500 | 12,500 | 7,000 | 14,700 | 10,000 |

| Example No. | 13 | 14 | 15 | 16 | 17 | 18 | 19 | 20 | 21 |
|---|---|---|---|---|---|---|---|---|---|
| Catalyst No. | 5 | 5 | 5 | 5 | 5 | 5 | 5 | 5 | 5 |
| Reaction Temp., °F. | 221 | 213 | 208 | 226 | 225 | 225 | 225 | 216 | 225 |
| Ethylene, mole % purity | 87 | 87 | 87 | 87 | 86 | 86 | 86 | 86 | 86 |
| Hydrogen, mole % | 4.4 | 4.0 | 4.0 | 4.0 | 4.0 | 4.0 | 4.0 | 4.0 | 4.0 |
| Butene-1, mole % of total feed | 0.4 | 0.5 | 0.5 | None | None | None | None | None | None |
| Oxygen, * ppm V/V | 0 | .15 | .25 | .25 | .25 | .15 (CO) | .4 ($C_2H_2$) | .25 ($H_2O$) | .35 |
| MI | 0.42 | 0.34 | 0.44 | 0.80 | 0.72 | 0.72 | 0.80 | 0.33 | 0.92 |
| Density | 0.954 | 0.954 | 0.955 | 0.962 | 0.962 | 0.963 | 0.963 | 0.963 | 0.963 |
| MFR | 74 | 103 | 107 | 65 | 71 | 63 | 69 | 97 | 72 |
| Productivity, lbs PE produced per pound of fresh catalyst | 29,000 | 16,000 | 10,500 | 11,000 | 10,200 | 10,000 | 5,000 | 7,400 | 9,000 |

* Unless otherwise indicated.

The MFR for the Example 2 run was 75 off the reactor, which is generally regarded as too low for a good resin for blow molding use when the melt index of the resin is in the range 0.4 or lower. Although this MFR can be increased by subsequent compounding, the compounding conditions likely would need to be sufficiently severe that other properties of the resin would be damaged by this severe compounding. The low MFR usually translates into more difficulty in processing the resin in blow molding applications. The Example 2 run was carried out using an oxygen addition rate of 0.25 moles of oxygen per million moles of fresh ethylene fed to the reaction zone.

Example 4 used a 1% chromium catalyst instead of the 0.25% chromium catalyst used in Example 2. However, the MFR for the resin produced in Example 4 was again low, about 74.

Example 5 used a 1% chromium catalyst and 0.15 ppm oxygen and the MFR was improved to 80.

Example 6 showed a still further improved MFR of 106. Example 6 used a 1% chromium catalyst and 0.25 ppm oxygen. This achievement of 106 MFR is very important with respect to blow molding uses for the resin.

Example 10 illustrates again the advantage of a relatively high chromium content catalyst, preferably around one weight percent chromium, coupled with the use of a taming agent, such as oxygen gas fed into the reaction zone, versus the use of a lower content chromium catalyst, such as in Example 3. The Example 10 MFR was 100 whereas the Example 3 MFR was only 73.

Example 16 provides data on and illustrates the use of the present invention in producing in gas phase a somewhat higher Melt Index resin compared to the earlier examples, such as Example 15. Example 16 used 0.25 ppm oxygen as was also the case with Example 15. But the MI for the resin product in Example 16 was 0.80 and this relatively high MI results in a lower MFR suitable for blow molding resin. It should be noted, however, that if oxygen had not been used in Example 16, the MFR would have been lower than the 65 achieved; the MFR would have been in the 50's.

It is now theorized that the higher chromium content catalyst and relatively higher oxygen (or equivalent taming agent) feed rates should be used in tandem for desirable gas phase blow molding resin production. Example 14 illustrates that a favorable MFR was achieved at 0.15 ppm oxygen using the 1% chromium catalyst compared to Example 11 where a 0.25% chromium catalyst was employed and a lower MFR was obtained at the same 0.15 ppm oxygen level. The data we have obtained supports the importance of using both (i.e., simultaneously) the relatively high chromium content catalyst and oxygen (or equivalent) to achieve the relatively high MFR.

Examples 18, 19 and 20 in Table I illustrate results using taming agents other than oxygen. In Example 18 carbon monoxide was used at 0.15 ppm V/V (parts per million carbon monoxide based on fresh ethylene feed) and no oxygen was used, in Example 19 the taming agent was acetylene in an amount of 0.4 ppm V/V based on fresh ethylene feed, and in Example 20, the taming agent was water. In all three of these examples the alternative taming agent was effective to achieve in higher MFR for the product resin than what would be produced off the reactor with the high-chromium content catalyst if no taming agent had been used.

What is claimed is:

1. A process for making a polymer which comprises feeding ethylene, or ethylene and a $C_3$-$C_8$ alpha olefin, to a polymerization reaction zone; contacting this feed under gas phase polymerization conditions with a catalyst comprising 0.7 to 2 weight percent chromium oxide, calculated as chromium, and 1 to 6 weight percent titanium oxide, calculated as titanium, on a silica support; and injecting oxygen as a catalyst productivity reduction agent into the reaction zone, wherein the catalyst productivity reduction agent is injected in an amount that is effective to increase the MFR of the polymer at least 8 units over a polymer obtained off the reactor for the same process conditions but without using oxygen in combination with the above-specified process conditions.

2. The process of claim 1 wherein the amount of oxygen used is between 0.05 and 0.6 moles of oxygen per million moles of fresh ethylene fed to the reaction zone.

3. The process of claim 1 wherein the catalyst preparation includes an activation heating step in an oxygen-containing gas at a temperature of 800° to 1600° F.

4. The process of claim 1 wherein the chromium content of the catalyst is between 0.8 and 1.2 weight percent and the titanium content is between 3 and 5 weight percent.

5. The process of claim 1 wherein the reaction conditions include a temperature between 150° and 230° F. and a pressure between 100 and 500 psig.

6. The process of claim 1 wherein the reaction is carried out in a fluidized bed of catalyst and polyethylene.

7. The process of claim 1 wherein ethylene and 1-butene or 1-hexene is fed to the reaction zone, and the amount of 1-butene or 1-hexene fed to the reaction zone is between 0.1 and 2 mole percent of the total ethylene feed.

8. A process comprising:

A) polymerizing monomer, which consists essentially of ethylene or ethylene and a $C_3$-$C_8$ alpha-olefin comonomer, B) in a gas-phase polymerization reactor C) and in the presence of
  (1) a polymerization catalyst which comprises
    (a) a silica support,
    (b) about 0.8–1.2 wt. % Cr, and
    (c) about 3–5 wt. % Ti
  10 wherein the polymerization catalyst is prepared by impregnating a chromium compound and a titanium compound onto the silica support and the catalyst is subsequently activated in an oxygen-containing gas at a temperature of 800°–1600° F. prior to introducing the catalyst into the polymerization reactor; and
  (2) oxygen in a ratio of between about 0.05 and about 0.6 moles of oxygen per million moles of fresh ethylene fed to the polymerization reactor wherein the process produces resin off the reactor having a melt-flow ratio of at least about 8 units greater than a process at the same processing conditions but without using oxygen in combination with the above-specified process conditions.

9. The process of claim 8 wherein

A) the melt-flow ratio of the resin is between about 65 and about 140 and the melt-index is between about 0.1 and 0.6 g/10 min.; and B) the temperature in the polymerization reactor is between 100° and 230° F. and the pressure in the polymerization reactor is between 100 and 500 psig.

10. The process of claim 9 wherein the monomer consists essentially of ethylene and 1-butene or 1-hexene, and the amount of 1-butene or 1-hexene fed to the reaction zone is between 0.1 and 2 mole percent of the total ethylene feed to the polymerization reactor.

11. The process of claim 8 wherein
A) the melt-flow ratio of the resin is between about 50 and about 90 and the melt-index is at least about 0.6 g/10 min.; and
B) the temperature in the polymerization reactor is between 100° and 230° F. and the pressure in the polymerization reactor is between 100 and 500 psig.

12. The process of claim 8 wherein the chromium compound is selected from the group consisting of chromium acetate and chromium oxide, and the titanium compound is titanium tetraisopropoxide.

* * * * *